United States Patent
Izawa et al.

(10) Patent No.: US 6,874,681 B1
(45) Date of Patent: Apr. 5, 2005

(54) VALUABLE PAPER DISTINGUISHABLE BY A VALIDATOR FOR DISCRIMINATING BILLS

(75) Inventors: Hikaru Izawa, Osaka (JP); Masanobu Fujita, Sagamihara (JP); Toitsu Ohya, Sagamihara (JP)

(73) Assignee: Japan Cash Machine Co. Ltd., Osaka (JP)

( * ) Notice: Subject to any disclaimer, the term of this patent is extended or adjusted under 35 U.S.C. 154(b) by 0 days.

(21) Appl. No.: 09/890,924
(22) PCT Filed: Dec. 10, 1999
(86) PCT No.: PCT/JP99/06967
§ 371 (c)(1),
(2), (4) Date: Jan. 15, 2002
(87) PCT Pub. No.: WO01/43082
PCT Pub. Date: Jun. 14, 2001
(51) Int. Cl.$^7$ .............................................. G06F 17/60
(52) U.S. Cl. ..................... 235/379; 382/135; 382/137; 382/138
(58) Field of Search ............................ 235/379, 468, 235/491, 475–476; 194/206, 219; 283/72, 113; 382/135, 137, 138–140

(56) References Cited

U.S. PATENT DOCUMENTS

| | | | | |
|---|---|---|---|---|
| 4,312,436 A | * | 1/1982 | Martin et al. ............... | 194/206 |
| 4,357,164 A | * | 11/1982 | Tsuji et al. ................ | 524/145 |
| 4,480,177 A | * | 10/1984 | Allen ........................ | 235/379 |
| 4,973,851 A | * | 11/1990 | Lee .......................... | 250/556 |
| 5,481,377 A | * | 1/1996 | Udagawa et al. ........... | 358/501 |
| 5,495,929 A | * | 3/1996 | Batalianets et al. ......... | 194/207 |
| 5,615,280 A | * | 3/1997 | Izawa et al. ................ | 382/135 |
| 5,729,623 A | * | 3/1998 | Omatu et al. ............... | 382/155 |
| 5,756,985 A | * | 5/1998 | Holste et al. ............... | 235/475 |
| 5,806,649 A | * | 9/1998 | Walsh et al. ................ | 194/203 |
| 6,104,812 A | * | 8/2000 | Koltai et al. ................. | 380/51 |
| 6,105,747 A | * | 8/2000 | Uemizo et al. ............. | 194/203 |
| 6,125,195 A | * | 9/2000 | Ohya et al. ................. | 382/135 |
| 6,179,110 B1 | * | 1/2001 | Ohkawa et al. ............ | 194/203 |
| 6,292,579 B1 | * | 9/2001 | Hutchinson ................. | 382/135 |
| 6,553,136 B1 | * | 4/2003 | Keshet et al. ............... | 382/135 |

FOREIGN PATENT DOCUMENTS

| | | | | |
|---|---|---|---|---|
| FR | 2 762 545 | 10/1998 | | |
| GB | 2 258 659 | 2/1993 | | |
| TW | 389878 A | * 5/2000 | ........... | G06F/17/60 |

* cited by examiner

Primary Examiner—Karl D. Frech
Assistant Examiner—Edwyn Labaze
(74) Attorney, Agent, or Firm—Bachman & LaPointe, P.C.

(57) ABSTRACT

A valuable paper is provided which comprises on a surface of the paper 50 a characteristic pattern 51 detectable by a sensor 16 of a validator 10 to discriminate authenticity of a bill inserted into the validator 10. The bill has at least a distinctive portion detectable by the sensor 16. The paper 50 has its width W substantially same as the width of the bill. The characteristic pattern 51 of the paper 50 is formed on substantially same position in width W as that of the distinctive portion in the bill. The paper 50 is inserted into the validator 10 to detect the characteristic pattern 51 of the paper 50 by the sensor 16 for discrimination of the paper 50 by the validator 10.

8 Claims, 3 Drawing Sheets

VALUABLE PAPER DISTINGUISHABLE BY A VALIDATOR FOR DISCRIMINATING BILLS

FIELD OF THE INVENTION

This invention relates to a valuable paper used as token or scrip in gaming or gambling accommodations wherein both of the valuable papers and bills are used and discriminated by a single validator.

BACKGROUND OF THE TECHNOLOGY

In gaming or gambling accommodations, a bill dispenser is connected with a gaming machine to dispense tokens in agreement with an amount of prize money a player wins in a game with the gaming machine. When a player achieves a great victory in the game, the dispenser distributes a large amount of tokens for the player. In this case, an improvement in the gaming machine has been made by dispensing actual bills in lieu of tokens to reduce the number of tokens to be distributed or stored.

In this case, however, a large amount of bills must be reserved and dispensed in stead of tokens equivalent to the prize money under the thorough and strict security protection for safety against theft in the gaming or gambling accommodations, and such security systems are expensive with much labor.

To solve this problem, it would be necessary to use valuable papers in the gaming or gambling accommodations in stead of bills so that the valuable papers can be distributed from dispensers and examined by valitators.

Accordingly, an object of the invention is to provide a valuable paper which can be examined by a validator to discriminate bills.

DISCLOSURE OF THE PRESENT INVENTION

A valuable paper according to the present invention comprises on at least a surface of the paper (50) a characteristic pattern (51) detectable by a sensor means (16) of a validator (10) for discriminating authenticity of a bill inserted into the validator (10). The paper (50) is inserted into the validator (10) to detect the characteristic pattern (51) of the paper (50) by the sensor means (16) for discrimination of the paper (50) by the validator (10).

The characteristic pattern (51) on the valuable paper (50) according to the present invention can be detected by the sensor means (16) to convert it into electric signals to the validator (10) which examines authenticity of the valuable paper (50) to prevent unauthorized use of the paper (50). Also, utilization of the valuable paper (50) can materialize abolishment of a dangerous system for reserving a large amount of bills to be paid to winners in gaming or gambling accommodations so as to facilitate management and control of the accommodations against theft under a strict security protection.

In an embodiment of the instant invention, the bill has at least a distinctive portion detectable by the sensor means (16). The paper (50) has its width (W) substantially same as that of the bill. The characteristic pattern (51) of the paper (50) is formed on the substantially same position in width (W) as that of the distinctive portion in the bill.

The validator (10) comprises an inlet sensor (40) for alternatively detecting the paper (50) or bill inserted into an inlet (13), a conveyor means (15) for alternatively transporting the paper (50) or bill along a passageway (12) in response to an output signal from the inlet sensor (40), and a validator control circuit for validating authenticity of the paper (50) or bill from an output signal of the sensor means (16) to control the conveyor means (15) so that the sensor means (16) detects an optically, magnetically or electrically characteristic pattern (51) and portion of the transported paper (50) or bill.

The characteristic pattern (51) printed on the valuable paper (50) is invisible or is invisibly covered with a mask coating on the valuable paper (50) to effectively prevent forgery of the paper (50). The characteristic pattern (51) is printed with ink being one or more selected from inks that: (a) produces impedance change in a magnetic field; (b) produces optical change; (c) includes magnetic material; (d) contains a metallic ingredient for absorbing infrared ray (53); (e) reflects infrared or ultraviolet ray (53); and (f) contains a metallic ingredient or fluorescent material for absorbing ultraviolet ray (53).

The ink may include vehicle which is one or mixture selected from groups of mineral oil such as gasoline, kerosene, light oil, machine oil, vaseline, paraffin wax; vegetable oil such as drying oil, semi- or non-drying oil, synthetic drying oil; and mixture of mineral oil or vegetable oil with synthetic resin or organic solvent. Also, the ink may include vehicle which contains synthetic resin such as ester rubber, denatured phenol resin, denatured alkyd resin or maleic rosin oxide.

The characteristic pattern (51) is printed with the ink including a metallic ingredient selected from the group consisting of iron(Fe), nickel (Ni), aluminum (Al), barium (Ba), lead (Pb) and titan (Ti). The characteristic pattern (51) may indicate at least one of country code, name of gaming or gambling accommodation, value level, starting or stopping information, testing mode and version data.

The above-mentioned as well as other objects of the present invention will become apparent during the course of the following detailed description and appended claims.

BEST MODE FOR EMBODIMENT OF THE INVENTION

Referring to FIG. 1 to FIG. 7, an embodiment of a valuable paper according to the present invention will be described hereinafter.

Figure 1:
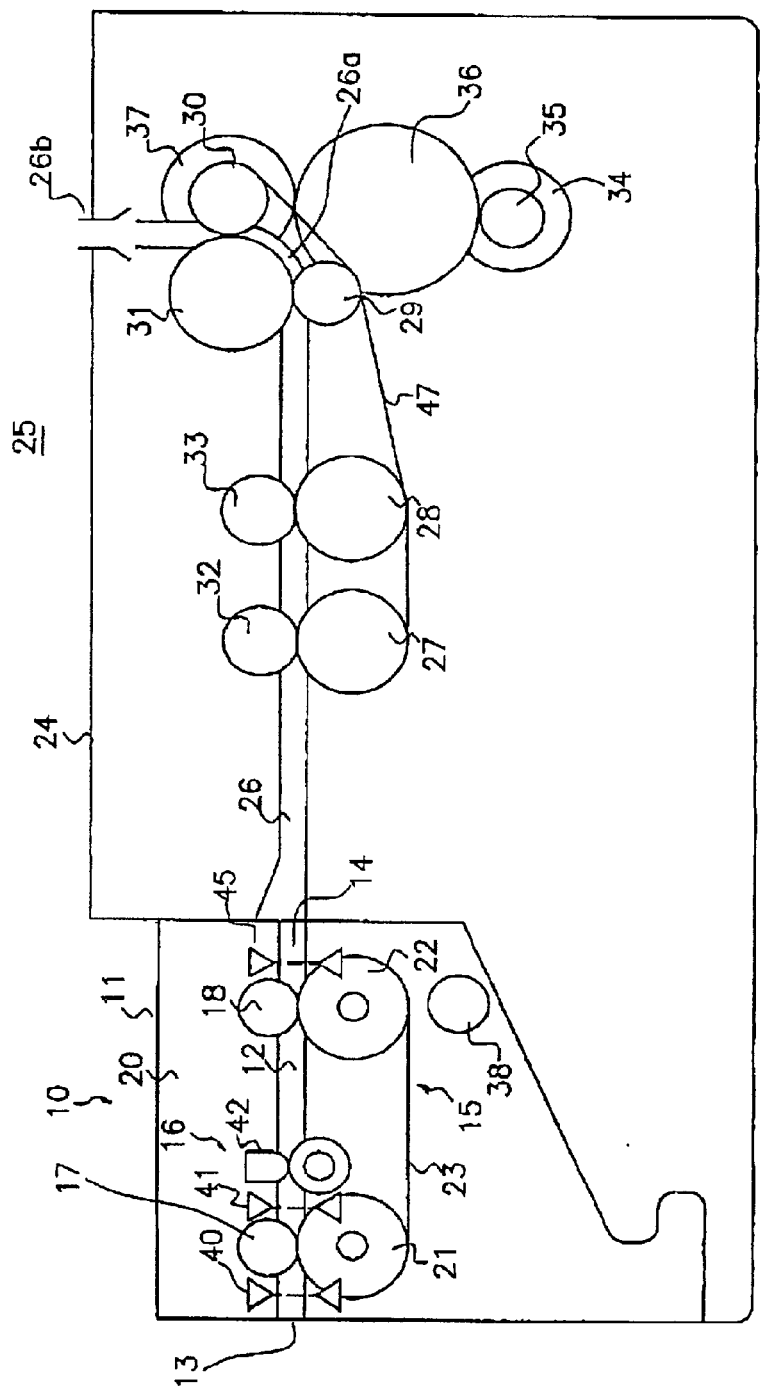
FIG. 1 is a cross-sectional view of a validator and a transport means equipped with the validator for discriminating a bill and a valuable paper according to the present invention.
Figure 2:
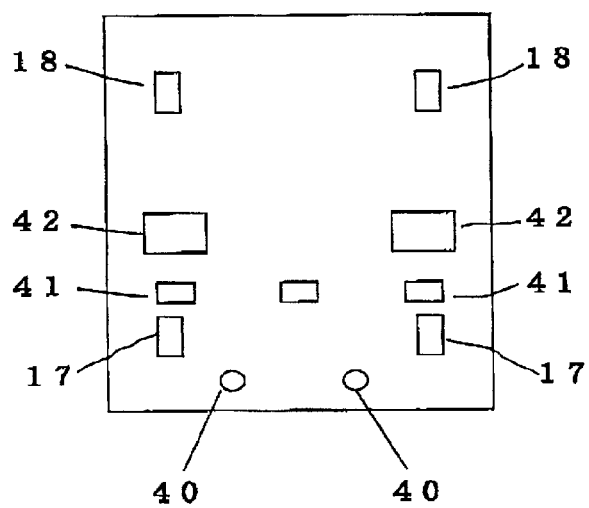
FIG. 2 is a plan view of the validator.

FIG. 1 shows a typical embodiment of the present invention applied to a bill validator 10 which includes a casing 11, a conveyer means 15 for transporting the bill or a valuable paper 50 inserted from an inlet 13 provided on a front surface of the validator 10 through a passageway 12 formed in the casing 11 to an outlet 14 formed at an inner end of the passageway 12, and a sensor means 16 disposed adjacent to the passageway 12 for detecting an optically, magnetically or electrically characteristic pattern 51 and portion of the transported bill or valuable paper 50. The sensor means 16 is connected to a validator control circuit (not shown) for receiving output signals of the sensor means 16 to validate authenticity of the bill or valuable paper 50 to control the conveyer means 38 of the conveyer means 15. As shown in FIG. 1, the casing 11 houses and supports the rollers 17, 18, and sensor means 16 attached in position to the casing 11. The validator control circuit has input terminals each connected to the inlet sensor 40 and sensor means 16.

The sensor means 16 comprises an optical sensor 41 such as a photocoupler and a magnetic sensor 42 such as a magnetic head to optically, magnetically or electrically detect characteristic patterns of the papers and bills and convert them into electric signals to a validator control circuit mounted in the validator 10. The electrically characteristic patterns are indicated by variation in permittivity or electric constant of the papers and bills. Provided in the inlet 13 of a discriminating unit 20 is an inlet sensor 40 which detects insertion of the bill or valuable paper 50 into the inlet 13 to produce a detection signal to the validator control circuit. An outlet sensor 45 is provided in proximity to the outlet 14 of the passageway 12 to detect the passage of the bill and produce detection signal to the validator control circuit 50. The conveyer means 15 includes a pair of pulleys 21, 22, a belt 23 wound around the pulleys 21, 22, rollers 17, 18 disposed in face of each pulleys 21, 22 and a conveyer motor 38 operatively connected to the pulley 22 to transport the bill or valuable paper 50 from the inlet 13 to the outlet 14 along the passageway 12 in response to the output of the inlet sensor 41.

Connected to the outlet 14 of the discriminating unit 20 is a transport means 24 which carries the bill discharged from the outlet 14 to a stacker 25 as a paper storage area along a carrier passage 26 in alignment with the passageway 12 of the discriminating unit 20. To this end, the transport means 24 comprises transport pulleys 27 to 31 adjacent to the carrier passage 26, and a belt 47 wound around transport pulleys 27 to 31. The upper ends of the three transport pulleys 27 to 29 are nearly disposed on a same horizontal plane to carry a bill along a linear way to the transport pulley 31 which forms a bent portion 26a of the carrier passage 26.

Push rollers 32, 33 are disposed in compressed contact to respectively the transport pulleys 27, 28 to firmly hold the paper between the pulley 27 and roller 32 and between the pulley 28 and roller 33 and move it backward to an outlet 26b connected to an inlet (not shown) of the stacker 25 through the upwardly curved bent portion 26a of the carrier passage 26. The belt 47 is wound around the transport pulley 30 to drive the belt 47 in contact to the transport pulley 31 provided in the opposite side of the carrier passage 26 so that the paper 50 can certainly be conveyed through the bent portion 26a to the outlet 26b. A pinion 35 is secured to an output shaft of a transport motor 34 and is mated with an intermediate gear 36 which is then meshed with a last stage gear 37 to rotate the transport pulley 30 and drive the belt 47 by rotation of the transport pulley 30.

Figure 3:
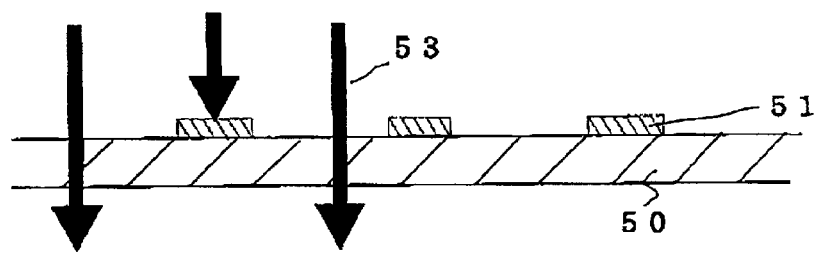
FIG. 3 is a cross sectional view of the valuable paper according to the present invention.

As shown in FIG. 3, the valuable paper 50 according to the present invention bears a characteristic pattern 51 printed on a surface of the paper 50 in the position where the optical and magnetic sensors 41, 42 of the validator 10 can detect the characteristic pattern 51. The sensors 41, 42 convert it into electric signals when the pattern 51 passes through the optical and magnetic sensors 41, 42 during the transportation by the conveyer means 15 to discriminate the valuable paper 50 by the validator 10. Usually, the valuable papers 50 are used in only a selected or specified gaming or gambling accommodations to enjoy games. The valuable papers 50 include tokens, scrips, substitutes for currency, collateral stocks and collateral bonds. The characteristic pattern 51 shown in FIG. 3 is printed with ink on the valuable paper 50 of paper or synthetic resin sheet. The ink may be one or more selected from inks that (a) produces impedance change in a magnetic field; (b) produces optical change; (c) includes magnetic material; (d) contains a metallic ingredient for absorbing infrared ray (53); (e) reflects infrared or ultraviolet ray (53); and (f) contains a metallic ingredient or fluorescent material for absorbing ultraviolet ray (53). For example, the ink may include a magnetic or ferrous material, a metallic ingredient or fluorescent material for absorbing infrared or ultraviolet ray 53. When the characteristic pattern 51 includes bar code information, it may contain a metallic ingredient for producing impedance change in a magnetic field, magnetic ingredient for producing magnetic change, an ingredient for absorbing infrared or ultraviolet ray 53 and an ingredient for reflecting infrared or ultraviolet ray 53. Visible, infrared and ultraviolet rays 53 can penetrate through and reflects on the paper-made valuable paper 50.

A vehicle of the ink is a mixture of oils selected from mineral oil such as gasoline, kerosene, light oil, machine oil, vaseline, paraffin wax; vegetable oil such as drying oil, semi- or non-drying oil, synthetic drying oil; and mixture of mineral oil or vegetable oil with synthetic resin or organic solvent. The vehicle may contain synthetic resin such as ester rubber, denatured phenol resin, denatured alkyd resin or maleic rosin oxide. The characteristic pattern 51 is printed with ink including a metallic ingredient selected from iron (Fe), nickel (Ni), aluminum (Al), barium (Ba), lead (Pb), and titan (Ti).

In an embodiment shown in FIG. 3, it is necessary to print the characteristic pattern 51 with invisible transparent or semi-transparent ink. As usual printing ink comprises mixture of vehicle and pigment for coloring, a given pattern can be printed without pigment by vehicle inclusive of a transparent or semi-transparent magnetic material or a material for absorbing or reflecting infrared or ultraviolet ray 53. The magnetic material includes vehicle inclusive of a ferrous or nickel ingredient, and the material for absorbing infrared and ultraviolet rays 53 includes vehicle inclusive of a metallic or fluorescent ingredient. The characteristic pattern 51 printed on the valuable paper 50 can represent country code, name of gaming or gambling accommodation, value level, starting or stopping information, testing mode and version data to prevent unauthorized use of the valuable paper by discriminating the characteristic pattern 51 with the validator 10. Also, the invisible characteristic pattern 51 is effective to prevent forgery of the valuable paper 50.

Figure 4:
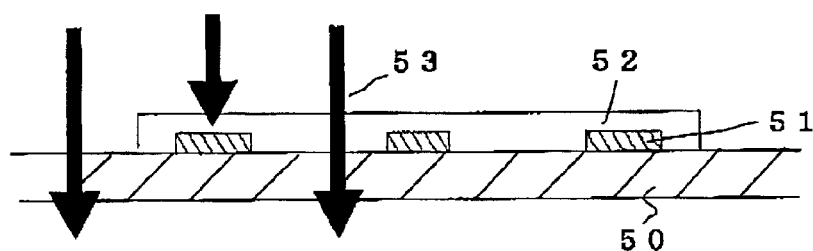
FIG. 4 is a cross sectional view of the valuable paper according to the second embodiment of the present invention.
Figure 5:
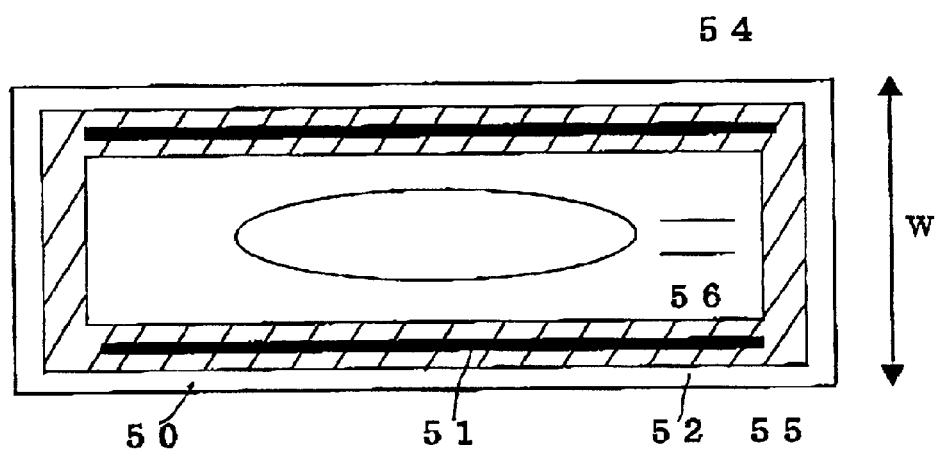
FIG. 5 is a plan view of the valuable paper shown in FIG. 4.

FIGS. 4 and 5 show a second embodiment of the valuable paper 50 according to the present invention. The valuable paper 50 comprises on the surface a characteristic pattern 51 which is optically, magnetically or electrically detectable by the sensor means 16 of the validator 10 to discriminate authenticity of bills inserted in the validator 10. Presently circulating bills have distinctive portions optically, magnetically or electrically detectable by the sensor means 16, and this distinctive portion is for example in portrait, watermark, indication of denomination or serial number printed on the bill. Accordingly, the valuable paper 50 should have its width W substantially same as that of the bill to be validated.

Also, the characteristic pattern 51 of the paper 50 should be formed on the substantially same position in width W as that of the distinctive portion in the bill. Therefore, the paper 50 can be inserted into the validator 10 to detect the characteristic pattern 51 of the paper 50 by the same sensor means 16 for discrimination of the paper 50 by the validator 10. The sensor means 16 can detect quantity of light penetrating the characteristic pattern 51 which is invisibly covered and concealed with a mask coating 52 printed on the characteristic pattern 51. The mask coating 52 may be formed of ink with pigment for color printing. In another aspect, the coating 52 may be formed with an ingredient free of impedance change or magnetic change in the magnetic field, or an ingredient permeable for infrared or ultraviolet ray 53. The characteristic pattern 51 can be formed for example in at least one of upper, bottom and central belt areas 54, 55, 56 of the paper 50 in agreement with the distinctive portion in the bill to be validated.

Figure 6:
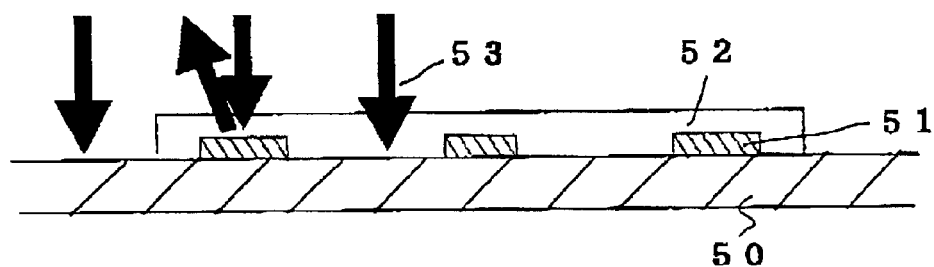
FIG. 6 is a cross-sectional view of the valuable paper according to the third embodiment of the present invention.
Figure 7:
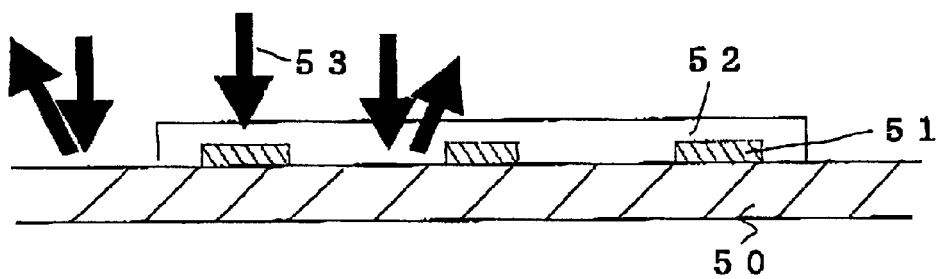
FIG. 7 is a cross-sectional view of the valuable paper according to the fourth embodiment of the present invention.

FIG. 6 shows a third embodiment of the valuable paper 50 to detect light quantity of infrared or ultraviolet ray 53 reflected on the characteristic pattern 51 or to detect fluorescence. FIG. 7 indicates a fourth embodiment of the valuable paper to detect light quantity of infrared or ultraviolet ray 53 reflected on the valuable paper 50 inclusive of a infrared or ultraviolet reflective material, however the characteristic pattern 51 is formed with ink of an infrared or ultraviolet absorbent material.

In the present invention, the characteristic pattern 51 and mask coating 52 are not limited to relief printing, and may be applied to various kind of printing such as photoprinting to copy on a surface of the valuable paper 50.

What is claimed is:

1. A valuable paper examined by a validator in gaming or gambling accommodations, said valuable paper comprising on at least a surface of the paper, a characteristic pattern detectable by a sensor means of the validator to discriminate the valuable paper inserted into the validator;

wherein the sensor means of the validator also detects at least a distinctive portion of a bill to discriminate authenticity of the bill inserted into the validator;

the characteristic pattern is invisibly printed on the valuable paper with an ink that contains at least one selected from (a) an ingredient for absorbing or reflecting infrared or ultraviolet ray; and (b) fluorescent material for producing an optical change.

2. The valuable paper of claim 1, wherein the characteristic pattern indicates at least one of country code, name of gaming or gambling accommodation, value level, starting information and stopping information, testing mode and version data.

3. The valuable paper of claim 1, wherein the valuable paper has its substantially same width as that of the bill; the characteristic pattern of the valuable paper is formed on the substantially same position in width as that of the distinctive portion in the bill.

4. The valuable paper of claim 1, wherein said valuable paper is selected from tokens, scrip and substitutes for currency, and the sensor means comprises an optical sensor for detecting the characteristic pattern on the valuable paper and the distinctive portion of the bill.

5. The valuable paper of claim 1, wherein the characteristic pattern is printed with invisible transparent or semi-transparent ink.

6. The valuable paper of claim 1, wherein the characteristic pattern is invisibly covered and concealed with a mask coating printed on the characteristic pattern, the mask coating is formed with an ingredient permeable by infrared or ultraviolet ray.

7. The valuable paper of claim 6, wherein the ink includes vehicle which contains synthetic resin such as ester rubber, denatured phenol resin, denatured alkyd resin, or maleic rosin oxide.

8. The valuable paper of claim 1, wherein the ink includes vehicle which is one or mixture selected from groups of mineral oil such as gasoline, kerosene, light oil, machine oil, vaseline, and paraffin wax; vegetable oil such as drying oil, semi- or non-drying oil, synthetic drying oil; and mixture of mineral oil or vegetable oil with synthetic resin or organic solvent.

* * * * *